(12) United States Patent
    Masago

(10) Patent No.: US 11,187,645 B2
(45) Date of Patent: Nov. 30, 2021

(54) ROAD SURFACE STATE ESTIMATION METHOD AND ROAD SURFACE STATE ESTIMATION DEVICE

(71) Applicant: BRIDGESTONE CORPORATION, Tokyo (JP)

(72) Inventor: Takeshi Masago, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 82 days.

(21) Appl. No.: 16/621,136

(22) PCT Filed: Apr. 12, 2018

(86) PCT No.: PCT/JP2018/015451
    § 371 (c)(1),
    (2) Date: Dec. 10, 2019

(87) PCT Pub. No.: WO2019/003576
    PCT Pub. Date: Jan. 3, 2019

(65) Prior Publication Data
    US 2020/0173908 A1    Jun. 4, 2020

(30) Foreign Application Priority Data
    Jun. 28, 2017   (JP) .............................. JP2017-126586

(51) Int. Cl.
    *B60C 19/00*    (2006.01)
    *B60W 40/06*    (2012.01)
    (Continued)

(52) U.S. Cl.
    CPC ............. *G01N 19/02* (2013.01); *B60C 19/00* (2013.01); *B60C 2019/004* (2013.01); *B60W 40/068* (2013.01)

(58) Field of Classification Search
    CPC .. G01M 17/02; G01M 17/021; G01M 17/022; G01M 17/027; G01M 17/025;
    (Continued)

(56) References Cited

U.S. PATENT DOCUMENTS 9,751,533 B2 *  9/2017  Singh ...................... B60C 23/20
    2010/0019964 A1 *  1/2010  Huang .................. G01M 17/06
                                                           342/357.31
    (Continued)

FOREIGN PATENT DOCUMENTS

EP        1219515 A1    7/2002
    EP        1897706 A1    3/2008
    (Continued)

OTHER PUBLICATIONS

Extended European Search Report dated Mar. 1, 2021 from the European Patent Office in EP Application No. 18822901.7.
    (Continued)

*Primary Examiner* — Andre J Allen
(74) *Attorney, Agent, or Firm* — Sughrue Mion, PLLC

(57) ABSTRACT

A device for estimating a state of a road surface on which a tire is running, the device including: an acceleration sensor 11 installed in the tire; an acceleration information acquiring means 12, 13, 14 that acquires acceleration information input to the tire from an output of the acceleration sensor 11; a storage means 15 that stores acceleration information of each road surface roughness set in advance; and a road surface state estimating means 16 that compares the acquired acceleration information with the acceleration information of each road surface roughness stored in the storage means 15 so as to estimate the state of the road surface.

3 Claims, 5 Drawing Sheets

(51) Int. Cl.
*G01N 19/02* (2006.01)
*B60W 40/068* (2012.01)

(58) Field of Classification Search
CPC .... G01M 17/024; G01M 17/10; G01M 1/045;
G01M 7/08; G01M 17/0076; G01M
17/013; G01M 17/03; G01M 17/04;
G01M 17/06; G01M 17/08; G01M 1/02;
G01M 1/12; G01M 1/16; G01M 1/225;
G01M 3/04; G01M 3/40; G01M 5/0091;
G01M 7/02; G01M 99/00; G01M 99/002
USPC .................................................. 73/146–146.8
See application file for complete search history.

(56) References Cited

U.S. PATENT DOCUMENTS

| | | | |
|---|---|---|---|
| 2013/0116972 A1 | 5/2013 | Hanatsuka et al. | |
| 2015/0284006 A1* | 10/2015 | Singh ................... | G01M 17/02 702/41 |
| 2016/0280014 A1* | 9/2016 | Masago ................ | B60C 11/243 |
| 2016/0368502 A1* | 12/2016 | Suzuki ................ | G01M 17/025 |
| 2018/0222458 A1* | 8/2018 | Suzuki ................ | G01M 17/025 |
| 2019/0120721 A1* | 4/2019 | Suzuki ................. | B60C 11/246 |
| 2020/0056983 A1* | 2/2020 | Masago .............. | B60W 40/064 |
| 2020/0317203 A1* | 10/2020 | Suzuki .................. | G01H 1/003 |
| 2020/0346655 A1* | 11/2020 | Suzuki ................. | B60C 11/246 |

FOREIGN PATENT DOCUMENTS

| | | |
|---|---|---|
| EP | 2573594 A1 | 3/2013 |
| JP | 2004-138549 A | 5/2004 |
| JP | 2007-55284 A | 3/2007 |
| JP | 2011-46256 A | 3/2011 |
| JP | 2011-203017 A | 10/2011 |
| JP | 2011-242303 A | 12/2011 |
| JP | 2015-38516 A | 2/2015 |
| JP | 5707791 B2 | 4/2015 |
| JP | 5855424 B2 | 2/2016 |
| WO | 01/98123 A1 | 12/2001 |
| WO | 2006/135090 A1 | 12/2006 |
| WO | 2017/187927 A1 | 11/2017 |

OTHER PUBLICATIONS

International Preliminary Report on Patentability with English translation of Written Opinion of the International Searching Authority dated Dec. 31, 2019 in International Application No. PCT/JP2018/015451.
International Search Report for PCT/JP2018/015451 dated Jul. 10, 2018 [PCT/ISA/210].

* cited by examiner

FIG.5(a) Rz=1.64 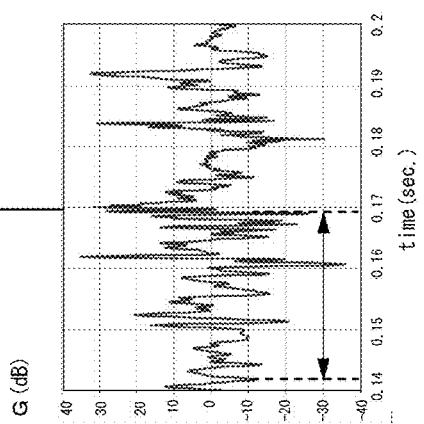 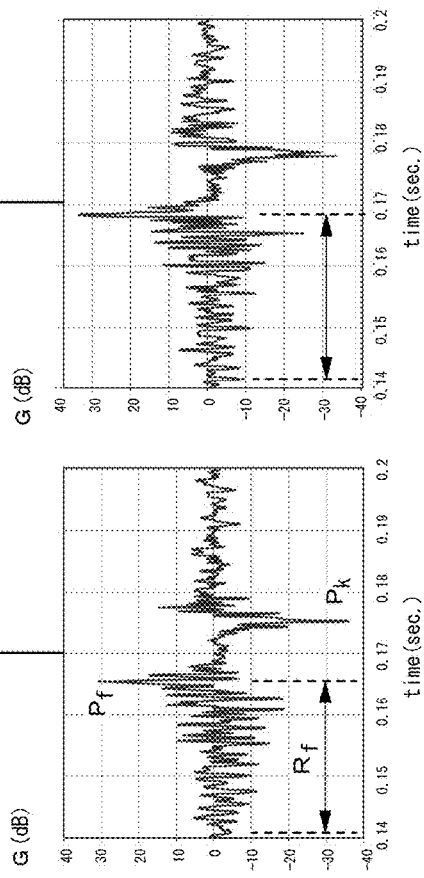
FIG.5(b) Rz=1.79 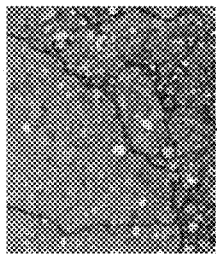 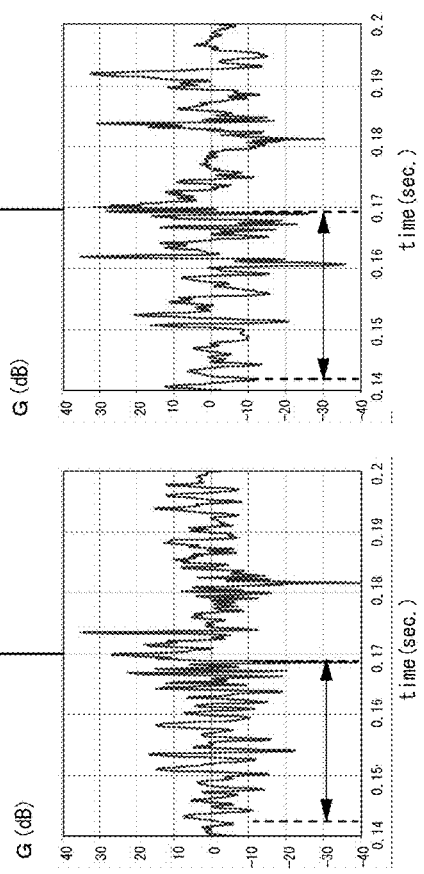
FIG.5(c) Rz=4.11 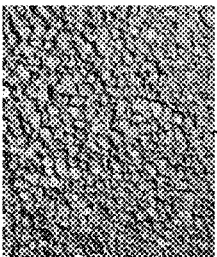 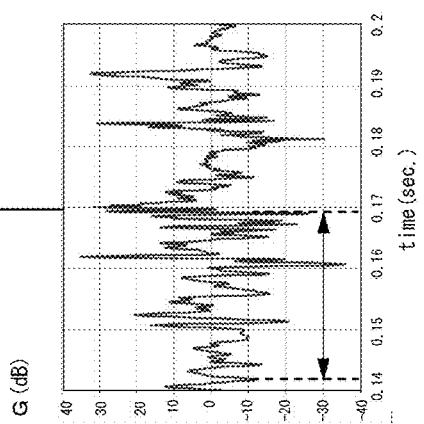
FIG.5(d) Rz=6.95 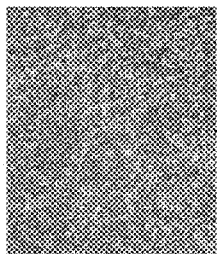 

ROAD SURFACE STATE ESTIMATION METHOD AND ROAD SURFACE STATE ESTIMATION DEVICE

CROSS REFERENCE TO RELATED APPLICATIONS

This application is a National Stage of International Application No. PCT/JP2018/015451, filed on Apr. 12, 2018, which claims priority from Japanese Patent Application No. 2017-126586, filed on Jun. 28, 2017.

TECHNICAL FIELD

The present invention relates to a method and a device for estimating an irregular state of a road surface.

BACKGROUND

In a case where a road surface on which a vehicle is running is so called a rough road with large irregularities, torque applied to a drive system including a transmission varies greatly. Now, if it is possible to estimate an irregular state of the road surface on which the vehicle is running, and control a driving force in accordance with the estimated irregular state of the road surface, the vehicle can be run stably.

Conventionally, as a method for estimating an irregular state of the road surface, there has been proposed a method in which a wheel speed, which changes depending on the irregularity of the road surface, is detected, and when the change exceeds a predetermined threshold value, it is determined that the road surface on which a vehicle is running is a rough road, or a method in which a rotation acceleration of a wheel or a rotating member that rotates along with the wheel in a certain relationship is obtained, and, based on a filtering-processed value obtained by subjecting the obtained rotation acceleration to filtering processing, the irregular state of the road surface is determined (see, for example, Patent Document 1).

CITATION DOCUMENT

Patent Document

Patent Document 1: Japanese Unexamined Patent Application Laid-open No. 2004-138549

SUMMARY OF THE INVENTION

Technical Problem

However, there has been a problem that, in the method described in Patent Document 1, because the irregular state of the road surface is estimated from vibration transmitted to the rotating member via the tire, not only it is impossible to detect irregularities other than large irregularities, but also it is difficult to accurately estimate a degree of the irregularity of the road surface.

The present invention has been made in view of the conventional problem and aims at providing a method and a device for accurately estimating the degree of the irregularity of the road surface.

Solution to Problem

The inventor has found, as a result of earnest examinations, that since an output waveform of an acceleration sensor installed in a tire greatly differs depending on a degree of irregularity of a road surface, if information on this acceleration waveform is used, it is possible to accurately estimate the degree of irregularity of the road surface, and thus the inventor has reached the present invention.

Namely, the present invention provides a method for estimating a state of a road surface on which a tire is running, the method including: a first step of acquiring acceleration information input to the tire by an acceleration sensor installed in the tire; a second step of comparing the acquired acceleration information with acceleration information of each road surface roughness set in advance; and a third step of estimating the state of the road surface from a comparison result.

The present invention also provides a device for estimating a state of a road surface on which a tire is running, the device including: an acceleration sensor that is installed in the tire; an acceleration information acquiring means that acquires acceleration information input to the tire from an output of the acceleration sensor; a storage means that stores acceleration information of each road surface roughness set in advance; and a road surface state estimating means that compares the acquired acceleration information with the acceleration information of each road surface roughness stored in the storage means so as to estimate the state of the road surface.

The summary of the invention does not enumerate all the features required for the present invention, and sub-combinations of these features may also become the invention.

BRIEF DESCRIPTION OF THE DRAWINGS

FIGS. 5(a) to 5(d) each illustrates a relationship between a road surface roughness and an acceleration waveform;

DESCRIPTION OF EMBODIMENT

Embodiment

Figure 1:
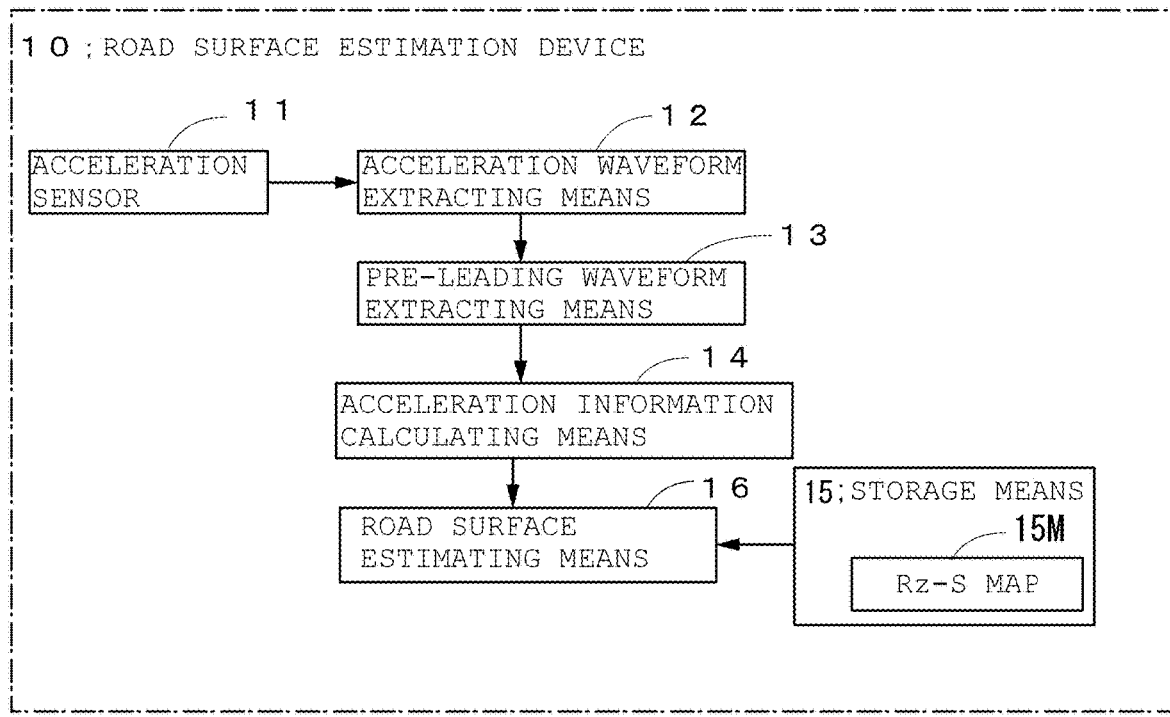
FIG. 1 is a diagram illustrating a configuration of a road surface state estimation device according to an embodiment of the present invention.

FIG. 1 is a diagram illustrating a configuration of a road surface state estimation device 10 according to an embodiment of the present invention.

The road surface state estimation device 10 includes an acceleration sensor 11, an acceleration waveform extracting means 12, a pre-leading waveform extracting means 13, an acceleration information calculating means 14, a storage means 15, and a road surface state estimating means 16, and estimates a road surface roughness of a road surface on which a tire is running.

The acceleration waveform extracting means 12, the pre-leading waveform extracting means 13 and the acceleration information calculating means 14 constitute an acceleration information acquiring means.

The acceleration waveform extracting means 12 to the road surface state estimating means 16 are each configured by computer software and a storage device such as a random access memory (RAM), for example.

Figure 2:
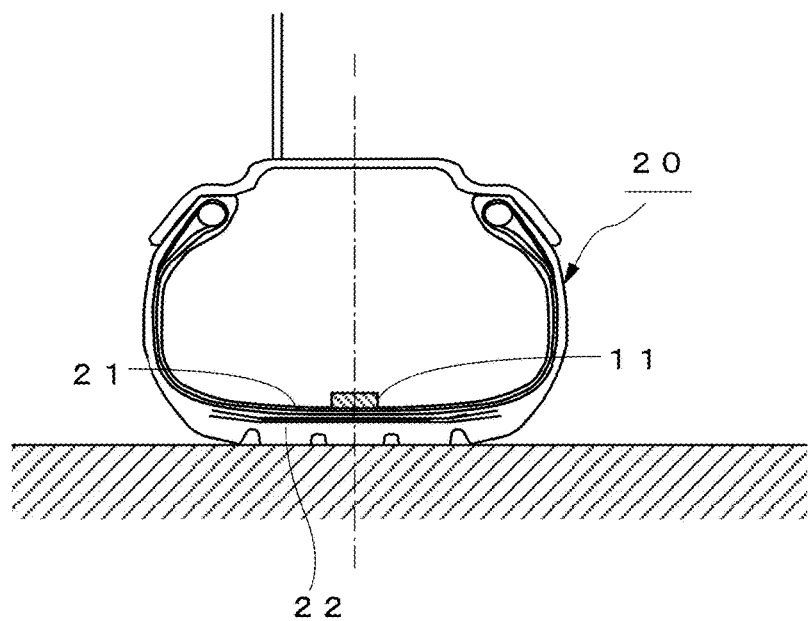
FIG. 2 is a diagram illustrating an example of how an acceleration sensor is mounted.

The acceleration sensor 11 is, as illustrated in FIG. 2, installed on an inner liner portion 21 of a tire 20 at a central portion in a tire width direction so that a detection direction becomes a tire circumferential direction to thereby detect acceleration in the tire circumferential direction input from the road surface to a tire tread 22.

Figure 3:
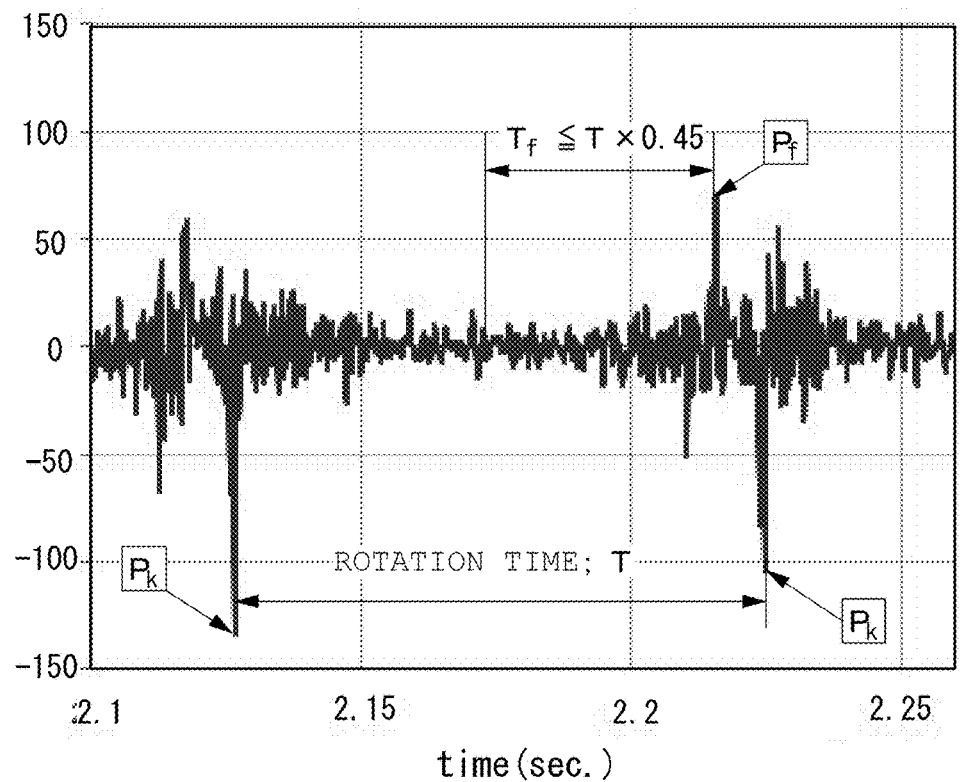
FIG. 3 is a diagram illustrating an example of a method of cutting out an acceleration waveform in a pre-leading region.

The acceleration waveform extracting means 12 extracts, as illustrated in FIG. 3, the acceleration waveform in the tire circumferential direction (hereinafter, referred to "acceleration waveform") that is a time-series waveform of the acceleration in the tire circumferential direction output from the acceleration sensor 11. In the meantime, as a length of the acceleration waveform to be extracted, a length including at least two peaks appearing on leading points $P_f$, or a length including at least two peaks appearing on trailing points $P_k$ is employed. Whereby, a rotation time T, which is a time required for the tire 20 to rotate one rotation, can be obtained from the acceleration waveform.

Incidentally, As illustrated in FIGS. 5(*a*) to 5(*d*), when the degree of irregularity of the road surface is large, since it is difficult to identify the peak position by the waveform as it is, positions of the leading point $P_f$ and the trailing point $P_k$ may be identified with the use of an acceleration waveform having passed through a low-pass filter whose cut-off frequency is several hundreds kHz or lower, for example.

The pre-leading waveform extracting means 13 extracts the acceleration waveform in the pre-leading region from the acceleration waveform extracted by the acceleration waveform extracting means 12. Here, the pre-leading region means a region before the leading point $P_f$ in which a region width $T_f$ is at most 0.45×T. In the present embodiment, $T_f$ was set to $T_f$=0.3×T, however, it is desirable to set the region width $T_f$ to $T_f \geq 0.03 \times T$ in order to obtain required information.

The acceleration information calculating means 14 calculates the acceleration waveform from the acceleration waveform in the pre-leading region extracted by the pre-leading waveform extracting means 13.

In the present embodiment, an RMS value S of the acceleration was used as the acceleration information.

$$S=(a_1^2+a_2^2+a_3^2+ \ldots +a_N^2)^{1/2} \times (1/N)$$

Here, $a_k$ is the acceleration at $t=t_k$, and N is the number of samplings.

The storage means 15 stores an Rz-S map 15M that is the acceleration information of each road surface roughness obtained in advance.

Here, Rz is a 10-point average surface roughness that is an index of the road surface roughness of the road surface on which the tire runs, and S is an RMS value of the acceleration at that time.

Figure 4:
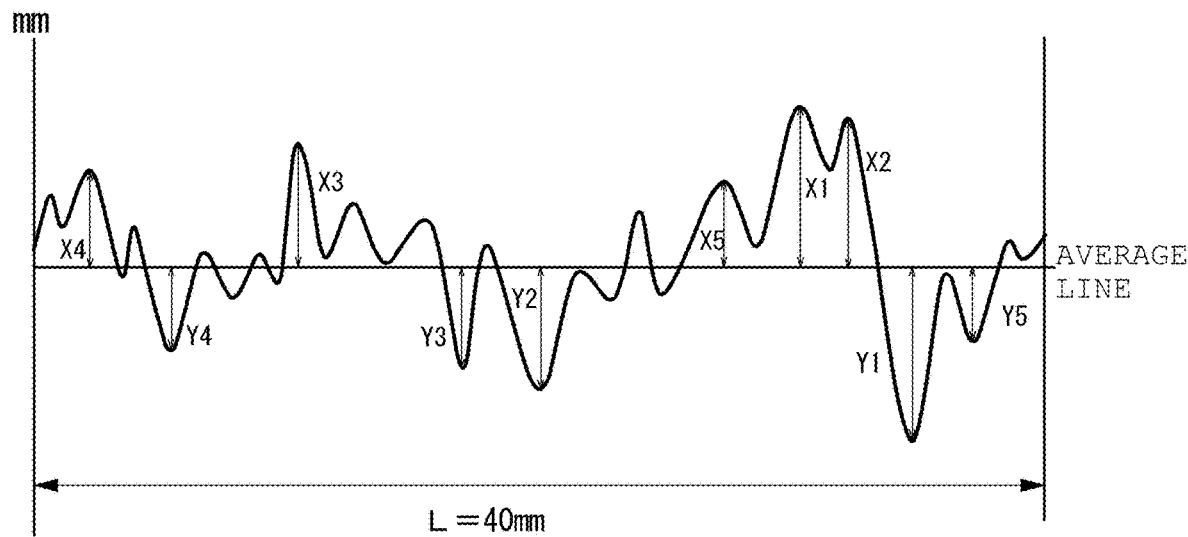
FIG. 4 is a diagram illustrating a method of calculating 10-point average roughness Rz.

As illustrated in FIG. 4, the 10-point average roughness Rz [mm] may be expressed as a sum of an absolute value of an average value of heights (X) of summits from the highest summit to the fifth summit distant from an average line of an extracted part that is a part extracted, from a roughness curve indicating the irregular state of the road surface, only for a reference length L (in this case 40 mm) in a direction of the average line of the roughness curve, and an absolute value of an average value of heights (Y) of valley bottoms from the lowest valley bottom to the fifth valley bottom distant from the average line of the extracted part.

$$Rz \text{ [mm]}=|X_1+X_2+X_3+X_4+X_5|/5+|Y_1+Y_2+Y_3+Y_4+Y_5|/5$$

Meanwhile, S is acceleration information (RMS value of the acceleration) calculated from the acceleration waveform in the pre-leading region, when the vehicle having the acceleration sensor installed therein is caused to run on road surfaces with various 10-point average roughness Rz. In the present embodiment, a vehicle with tires whose tire size is 195/65R15 was caused to run at a speed of 50 km/h to obtain the RMS value S of the acceleration of each road surface roughness.

FIGS. 5(*a*) to 5(*d*) illustrate differences in the acceleration waveforms depending on Rz.

Figure 6:
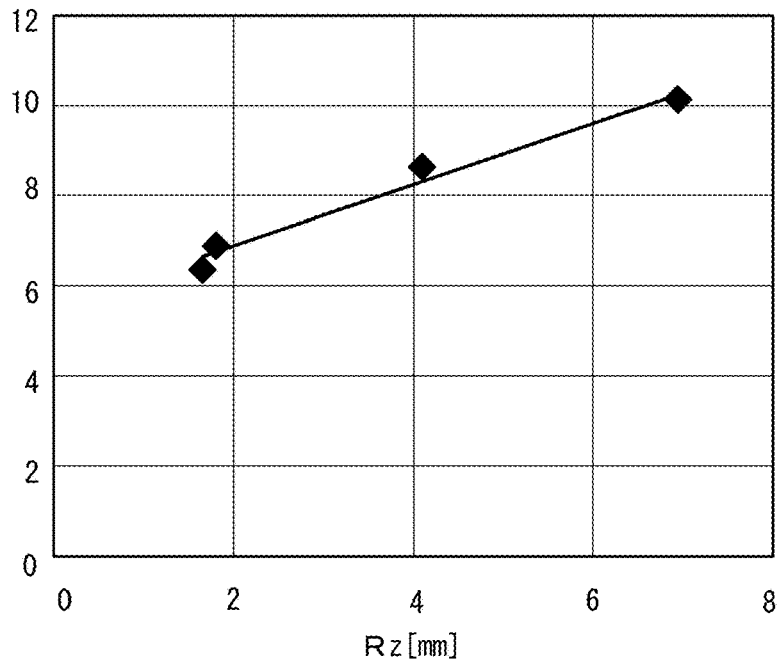
FIG. 6 is a diagram illustrating a relationship between the road surface roughness and an RMS value of accelerations in the pre-leading region.

As illustrated in FIGS. 5(*a*) to 5(*d*), it is noted that the larger the Rz becomes, the larger the amplitude of the acceleration becomes. This is because the rougher the road surface roughness is, the greater the input from the road surface to the tire becomes FIG. 6 is a diagram illustrating Rz-S map 15M, and as is apparent from FIG. 6, because the 10-point average roughness Rz and the RMS value of the acceleration exhibit a high correlation ($R^2$=0.9774), by using this Rz-S map, it is possible to accurately estimate the state of the road surface.

The road surface state estimating unit 16 estimates, by obtaining the 10-point average roughness Rz from the RMS value S of the acceleration calculated by the acceleration information calculating means 14 and the Rz-S map stored in the storage means 15, the road surface roughness of the road surface on which the tire is running. For example, if S=8.2 [G], it can be estimated that the 10-point average roughness Rz of the road surface is 4.

Figure 7:
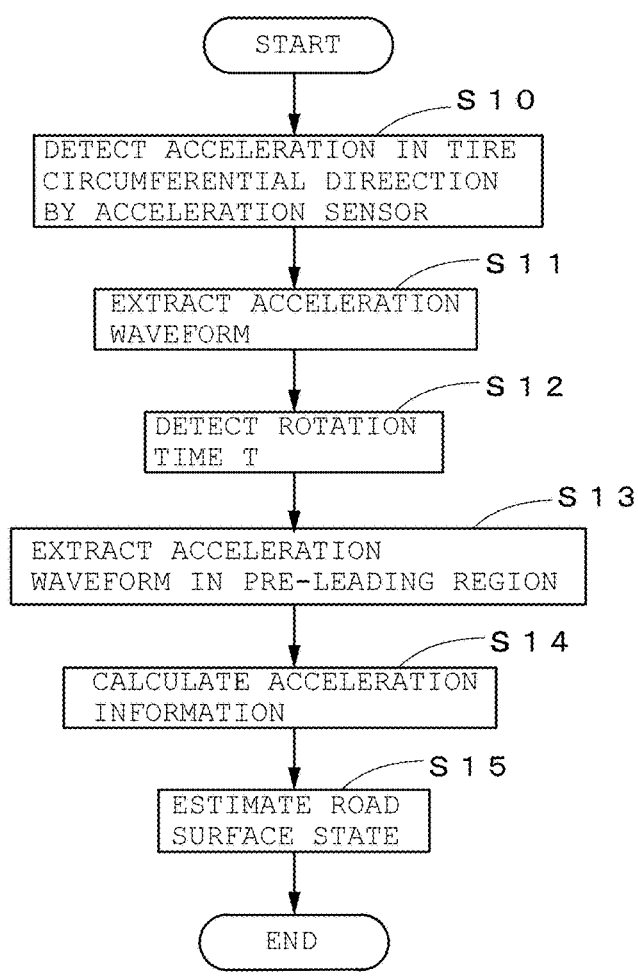
FIG. 7 is a flowchart illustrating a road surface state estimating method according to the present invention.

Next, the road surface state estimation method according to the present invention will be described with reference to the flowchart of FIG. 7.

First, detecting by the acceleration sensor 11, an acceleration signal in the tire circumferential direction, which is input to the tire 20 (step S10), then extracting the acceleration waveform from the detected acceleration signal in the tire circumferential direction (step S11).

Then, obtaining, from the extracted acceleration waveform, a time interval between the peaks appearing on two trailing points $P_k$ that are temporally adjacent to each other and making this time interval as a rotation time T that is a time required for the tire 20 to rotate for one rotation (step S12).

Next, extracting, from the acceleration waveform, extracting the acceleration waveform in the pre-leading region (step S13), and from the extracted acceleration waveform in the pre-leading region, calculating the RMS value S of the acceleration that is the acceleration information (S14).

Next, comparing the Rz-S map 15M that is the acceleration information of each road surface roughness that has been stored in advance in the storage means 15 with the calculated RMS value S of the acceleration to obtain the 10-point average roughness Rz that is the index of the road surface roughness, and estimating the state (rod surface roughness) of the road surface on which the tire is running (step S15).

Though the present invention has been described with the use of the embodiment, the technical scope of the present invention is not limited to the scope described in the above embodiment. It is apparent to those skilled in the art that various modifications and improvements can be added to the above-described embodiment. It is also apparent from the scope of the claims that such modifications or improvements may be included in the technical scope of the present invention.

For example, in the above-described embodiment, the degree of irregularity of the road surface was estimated from the acceleration in the tire circumferential direction, however, acceleration in the tire radial direction may be used. That is, because the input from the road surface can be separated into an input in the tire circumferential direction and an input in the tire radial direction, the degree of irregularity of the road surface can be estimated accurately even the acceleration in the tire radial direction is used.

Further, in the above-described embodiment, the road surface roughness was estimated by using the RMS value S of the acceleration in the pre-leading region extracted from the acceleration waveform in the pre-leading region, but the acceleration waveform from the pre-leading region to the post-trailing region may be used. However, because the acceleration level from the contact patch to the post-trailing region is easily influenced by a tire structure or a tread pattern, it is desirable to use the acceleration waveform in the pre-leading region, as in the present embodiment.

Further, in the above-described embodiment, the RMS value S of the acceleration in the pre-leading region was used as the acceleration waveform, however, as shown below, if an RMS value S' which is corrected by the tire rotational speed (or the vehicle speed) is used instead of the RMS value S of the acceleration, the degree of irregularity of the road surface can be estimated more accurately.

$$S' = S \times T^2$$

T: rotation time of the tire

Furthermore, in the above-described embodiment, the 10-point average roughness Rz was used as the index of the road surface roughness, however, an index of the road surface roughness such as an average roughness R$\alpha$ other than Rz may be used. The average roughness R$\alpha$ can be expressed as R$\alpha$ [mm]=($|Z_1|+|Z_2|+ \ldots +|Z_N|$)/N, when the distance between the average line and the peak value $Z_k$ (k=1~N; N is the number of irregularities within the reference length L) of the irregularities within the reference length L illustrated in FIG. 4, is $|Z_k|$.

Figure 8:
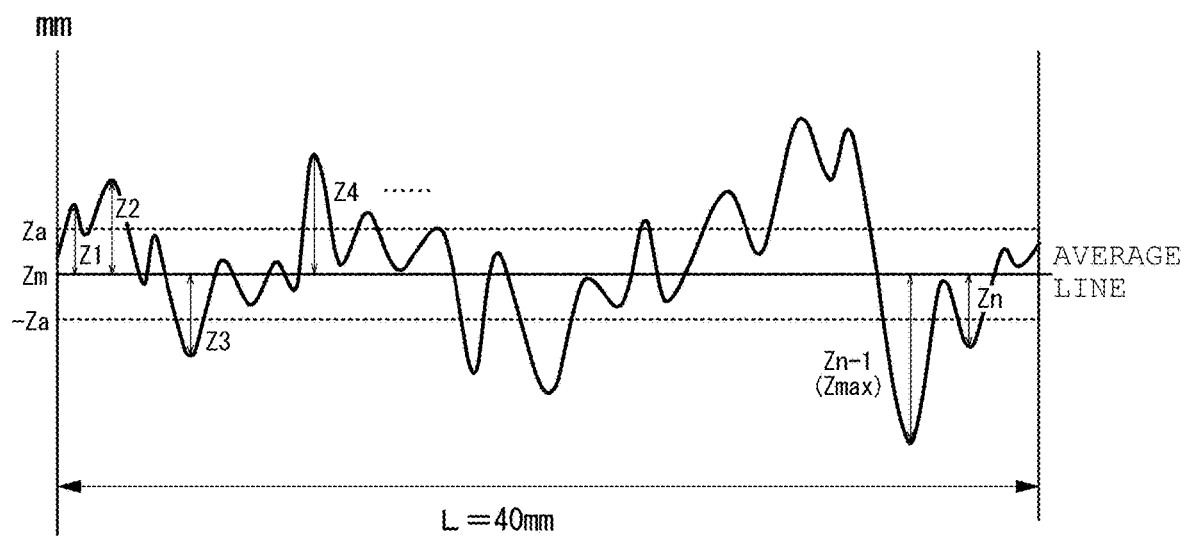
FIG. 8 is a diagram illustrating a method of calculating another index of the road surface roughness.

Incidentally, as illustrated in FIG. 8, as the peak value $Z_k$, by selecting only irregularities having the peak value $Z_k$ greater than the predetermined threshold value Za (>0), the average value of the distances of these irregularities with respect to the average line $Z_m$ may be used as the index.

Instead, $|Z_{max}|$ that is the maximum value of $|Z_k|$ may be used as the index of the road surface roughness.

In summary, it can also be described as follows. That is, the present invention provides a method for estimating a state of a road surface on which a tire is running, the method including: a first step of acquiring acceleration information input to the tire by an acceleration sensor installed in the tire; a second step of comparing the acquired acceleration information with acceleration information of each road surface roughness set in advance; and a third step of estimating the state of the road surface from a comparison result.

In this way, because the irregular state of the road surface is estimated from vibration information acting on the tire that is directly in contact with the road surface, the degree of irregularity of the road surface can be estimated accurately.

Further, the acceleration information acquired in the first step or the acceleration information compared in the second step is the information of the acceleration waveform in the pre-leading region of the acceleration waveform detected by the acceleration sensor.

With this, since the degree of irregularity of the road surface can be estimated without being affected by the tire structure or the tread pattern, the accuracy of estimation of the degree of irregularity of the road surface can further be improved.

Furthermore, the present invention provides a device for estimating a state of a road surface on which a tire is traveling, the device including: an acceleration sensor installed in the tire; an acceleration information acquiring means that acquires acceleration information input to the tire from an output of the acceleration sensor; a storage means that stores acceleration information of each road surface roughness set in advance; and a road surface state estimating means that compares the acquired acceleration information with the acceleration information of each road surface roughness stored in the storage means so as to estimate the state of the road surface.

By employing the configuration described above, it is possible to realize the device for estimating the state of the road surface that can precisely estimate the degree of irregularity of the road surface.

REFERENCE SIGN LIST

10: road surface state estimation device, 11: acceleration sensor, 12: acceleration waveform extracting means, 13: pre-leading waveform extracting means, 14: acceleration information calculating means, 15: storage means, 15M: Rz-S map, 16: road surface state estimating means, 20: tire, 21: inner liner portion, and 22: tire tread.

The invention claimed is:

1. A method for estimating a state of a road surface on which a tire is running, the method comprising:
    a first step of acquiring acceleration information input to the tire by an acceleration sensor installed in the tire;
    a second step of comparing the acquired acceleration information with acceleration information of each of a plurality of road surface roughnesses set in advance; and
    a third step of estimating the state of the road surface from a comparison result.

2. The method for estimating a state of a road surface according to claim 1, wherein, the acceleration information acquired in the first step or the acceleration information compared in the second step is information of a pre-leading acceleration waveform out of the acceleration waveform detected by the acceleration sensor.

3. A device for estimating a state of a road surface on which a tire is running, the device comprising:
    an acceleration sensor installed in the tire;
    an acceleration information acquiring means that acquires acceleration information input to the tire from an output of the acceleration sensor;
    a storage means that stores acceleration information of each of a plurality of road surface roughnesses set in advance; and
    a road surface state estimating means that compares the acquired acceleration information with the acceleration information of the each road surface roughness stored in the storage means so as to estimate the state of the road surface.

* * * * *